US008768140B2

(12) United States Patent
Hirano

(10) Patent No.: US 8,768,140 B2
(45) Date of Patent: Jul. 1, 2014

(54) DATA PROCESSING UNIT AND DATA ENCODING DEVICE

(75) Inventor: Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/576,270

(22) PCT Filed: Feb. 2, 2011

(86) PCT No.: PCT/JP2011/000575
§ 371 (c)(1),
(2), (4) Date: Jul. 31, 2012

(87) PCT Pub. No.: WO2011/099254
PCT Pub. Date: Aug. 18, 2011

(65) Prior Publication Data
US 2012/0301099 A1    Nov. 29, 2012

(30) Foreign Application Priority Data
Feb. 15, 2010    (JP) .................................. 2010-030278

(51) Int. Cl.
*H04N 5/77*    (2006.01)
(52) U.S. Cl.
USPC .......................................... 386/224; 386/239
(58) Field of Classification Search
None
See application file for complete search history.

(56) References Cited
U.S. PATENT DOCUMENTS 5,734,427 A    3/1998   Hayashi
6,163,574 A *  12/2000  Yagasaki .................. 375/240.13
2001/0004352 A1    6/2001  Watanabe et al.
2007/0052847 A1 *  3/2007  Yamada ........................ 348/468
2007/0074266 A1    3/2007  Raveendran et al.
2009/0196343 A1 *  8/2009  Cho et al. ................. 375/240.02
2009/0252425 A1 * 10/2009  Bruls et al. ..................... 382/232

FOREIGN PATENT DOCUMENTS

| JP | 2001-177573 A | 6/2001 |
| JP | 2005-354419 A | 12/2005 |
| JP | 2008-507180 A | 3/2008 |
| WO | 03/009581 A1 | 1/2003 |
| WO | 03/056810 A1 | 7/2003 |
| WO | 2006/008681 A1 | 1/2006 |

OTHER PUBLICATIONS

ITU-T (International Telecommunication Uniion-Telecommunication sector) Recommendation G.729.1, May 2006.

(Continued)

*Primary Examiner* — William C Vaughn, Jr.
*Assistant Examiner* — Eileen Adams
(74) *Attorney, Agent, or Firm* — Pearne & Gordon LLP

(57) ABSTRACT

Disclosed in a technique for performing data transmission between units efficiently in an imaging device, in which a camera unit and the other units (particularly a display unit) are separated and connected wirelessly, to improve convenience. According to this technique, video content data imaged by an imaging section is encoded, by means of hierarchical coding, into checking content coded data of a core layer and saving content coded data of an enhancement layer. The checking content coded data is sent immediately from a checking content transmission section 906 to a display unit 950 through wireless communication, and a display thereof is output. On the other hand, the saving content coded data is stored in a recording section 907 together with the checking content coded data. Thus, both a rapid display of video content data and storage thereof while keeping the quality are achieved.

15 Claims, 4 Drawing Sheets

(56) References Cited

OTHER PUBLICATIONS

International Search Report for PCT/JP2011/000575 dated Mar. 1, 2011.

Supplementary European Search Report for Application No. 11742004.2-1902 / 2538670 dated Jul. 8, 2013.

"Virtual teleseparation in a photographic device", IP.com Journal, IP.com, Inc., West Henrietta, NY, US, May 6, 2004, XP013020174.

* cited by examiner

DATA PROCESSING UNIT AND DATA ENCODING DEVICE

TECHNICAL FIELD

The present invention relates to a data processing unit and a data encoding device for encoding content data.

BACKGROUND ART

With the improvement of mobile communication technologies, the 3rd Generation Partnership Program (3GPP) has developed mobility (high-speed movement of a terminal device) support, broadband (high-throughput) data communication support, and the like, to enable the transmission of multimedia data such as video as well as sound in order to provide wireless communication services across a very broad range.

In multimedia data communication, data to be transmitted, such as sound and video, is encoded and transmitted to achieve efficiency, stabilization, and the like, at various points, such as the bandwidth consumption of communication channels and the channel properties. As one of such data encoding methods, there is a hierarchical coding technique.

In the hierarchical coding technique, video and sound are classified by quality, intended purpose, or the like, and layered in respective levels so that additional information will be encoded as an information block separable from fundamental data. Each information block can be sent and received individually, and synthesized as required so that one coded data group can be used in various environments. As a precedent method already employed internationally as the hierarchical audio coding technique, there is a technique described in Non-Patent Document 1 cited below. Patent Document 1 also discloses a method of compressing image data different in quality.

In general, the camcorder is designed to enable a camera operator to hold it to perform shooting and recording. The camcorder is relatively small, with means (mostly, a view finder) for checking video shot by the camera operator integrated therein. However, for example, there are cases where camera shake occurs when the camera operator moves his hands holding the camcorder to look through the view finder, or it is difficult to check the shot video from some distance. Patent Document 2 cited below discloses a camcorder equipped with an external unit removable from a camera unit. According to the camcorder disclosed in Patent Document 2, the camera unit is separated from the other units with the connections therebetween made up with communication, whether wired or wireless, to enable shooting corresponding to user's various usage scenes of the digital camcorder.

PRIOR ART DOCUMENTS

Patent Documents

Patent Document 1: Japanese Patent Application Publication No. 2008-507180
Patent Document 2: Japanese Patent Application Publication No. 2005-354419

NON-PATENT DOCUMENTS

Non-Patent Document 1: ITU-T (International Telecommunication Union-Telecommunication sector) Recommendation G.729.1, May, 2006.

However, in an actual usage environment, for example, when units are linked by wired connections even if the camera unit and a display unit such as a view finder are designed to be removable, handling of equipment by a camera operator is limited or complicated, and hence convenience is not always improved. In order to further improve convenience, it is desired to connect the units wirelessly. However, in the case of the wireless connection between the units, the following problems arise:

Resistance to interference (radio wave interference) from wireless communication resources must be added.

Since the transmission band is limited compared with the wired connection, encoding such as the compression of digital data is required.

Since additional image processing is required, a delay time for processing or transmission occurs. In this case, when shot video in the camera unit is displayed on the display unit, the display of images is considerably delayed, and this causes a difference between the actual shot video and intuitive actions of the camera operator.

Especially, in the case of a small camcorder, the camera unit is often equipped with other sensing devices (sound pick-up device, ranging device, battery sensor, acceleration sensor, and the like) as well as an imaging device. In this specification, since the camera unit often has various sensing devices including the imaging device, it may be referred to as a sensing unit or simply referred to as a camera unit (on the assumption that various sensing devices are included) to give an easy-to-understand description. Further, data acquired in a sensing device may be referred to as sensing data. When the sensing device is an imaging device, the sensing data includes video data, while when the sensing device is a sound pick-up device, the sensing data includes audio data. The other sensing devices acquire corresponding sensing data, respectively.

In order to solve the above problems, it is an object of the present invention to provide a data processing unit and a data encoding device for performing data transmission between units efficiently in a sensing device, in which a camera unit and the other units (particularly, the display unit or the audio output unit) are separated and connected wirelessly, to improve convenience.

SUMMARY OF INVENTION

In order to achieve the above object, the data processing unit of the present invention is a data processing unit connected wirelessly to an output device for outputting sensing data and capable of processing the sensing data to be output by the output device, the data processing unit comprising:

a data acquiring section for acquiring the sensing data to be output by the output device;

a first encoding section for encoding, with a predetermined quality, the sensing data acquired by the data acquiring section to generate first coded data;

a radio transmission section for transmitting the first coded data generated by the first encoding section sequentially to the output device through a radio connection;

a second encoding section for extracting, from the sensing data acquired by the data acquiring section, additional information for increasing a quality of a content included in the first coded data, and encoding the additional information to generate second coded data; and a transmission section for transmitting the first coded data and the second coded data to a recording device to record the first coded data and the second coded data on a recording medium.

According to this configuration, the time required to output data (e.g., video data or audio data) acquired by the sensing device to the output device (e.g., a display unit or an audio output unit) can be shortened. Further, the amount of data to be transmitted to the output device can also be reduced, thereby realizing steady data output.

Further, in order to achieve the above object, the data encoding device of the present invention is a data encoding device capable of performing processing on specific sensing data, comprising:

a first encoding section for encoding input sensing data with a predetermined quality to generate first coded data; and a second encoding section for extracting, from the input sensing data, additional information for increasing a quality of a content included in the first coded data and encoding the additional information to generate second coded data.

According to this configuration, first coded data for making it possible to check the content of input sensing data can be output rapidly, and second coded data for increasing the quality can further be output.

The present invention has the above-mentioned configurations, having the advantage of performing data transmission between units efficiently in a sensing device, in which a sensing unit and the other units (particularly, the display unit or the audio output unit) are separated and connected wirelessly, to improve convenience.

DESCRIPTION OF EMBODIMENTS

Figure 1:
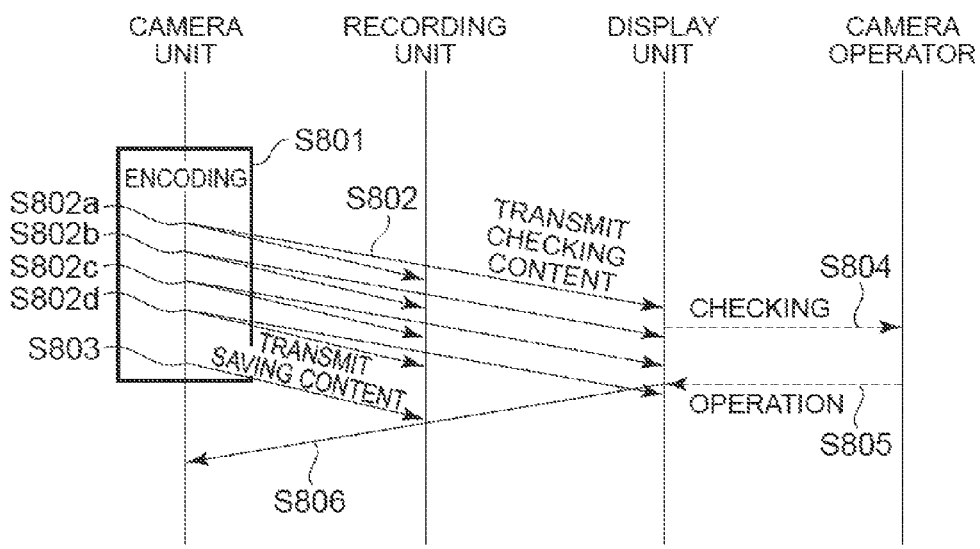
FIG. 1 It is a sequence chart showing an example of content processing in a content communication device according to a preferred embodiment of the present invention.

A preferred embodiment of the present invention will now be described with reference to the accompanying drawings.

For example, various locations are assumed as shooting environments in which shooing with a digital camcorder is performed. The content to be checked on a display unit is to be used mainly for adjusting a composition (i.e., used to check on timing, the composition, a subject, etc.), and in many cases, it is not an indispensable condition that an image displayed on the display unit is equivalent to stored data in terms of the image resolution, frame rate, audio band, and the like. Thus, focusing on the fact that quality deterioration (coarse material) of the image displayed on the display unit is allowed to some extent as long as the composition can be adjusted, data to be recorded and data to be displayed are encoded with different levels of quality to record and display the data in the present invention.

A content communication device using hierarchical coding of the present invention is not limited to professional equipment for broadcasting/delivery (e.g., equipment used at a television station), and the present invention can be applied to common digital camcorders. The following will describe a preferred embodiment in which the present invention is applied to a common digital camcorder.

The status of the digital camcorder to be notified, such as video displayed on a view finder or a liquid crystal display of the camcorder, sound to be output, shooting parameters, the recording time, the remaining time, and the remaining amount of battery (hereinafter collectively called a content), is transmitted to a display unit located in a place away from the digital camcorder using a communication method of the present invention, and if any operation has been done there, it is sent back to the camcorder.

The content shot with the camcorder is basically stored in a recording unit incorporated in or connected to the camcorder. On the other hand, in the data transmission to check a content being shot, the content cannot be always transmitted steadily to the display unit while keeping the data size of the content to be stored.

In the method of the present invention, a saving content to the recording unit and a checking content as a coarse material are distinguished to enable efficient transmission from the camera unit of the camcorder to the display unit. The checking content is referred to enable the camera operator to carry out operations, such as zooming, composition adjustment, recording level control, start operation, and stop operation, in real time even if the camera operator cannot or is hard to have a direct view of the display device (in a state of being physically integrated with the camcorder) of the camcorder.

Here, since the saving content is recorded in the recording unit incorporated in or connected to the camcorder in some way, the display unit receiving the checking content does not necessarily need to store the content received. When the recording unit is integrated with the camcorder, the content is transmitted to the recording unit through a connection interface in the camcorder, while when the recording device is separated from the camcorder (including a case where it is integrated with the display unit), the content is transmitted to the recording unit through an interface of the camcorder.

The following will specifically describe the embodiment of the present invention. In the embodiment of the present invention, a hierarchical coding technique is applied to data transmission between units in a configuration, in which a camera unit is separated from the other units (e.g., a recording unit and a display unit) and the units are connected wirelessly in a camcorder for capturing video and recording sound, to realize a camera with excellent convenience.

FIG. 1 is a sequence chart showing an example of content processing in a content communication device according to the embodiment of the present invention. This sequence chart is illustrated by focusing attention on content data at a certain time, but the fact of the matter is that data including the checking content and the saving content are transmitted and processed sequentially. Here, it is also assumed that the camcorder has a camera unit capable of capturing images (and picking up sound), and that a display unit (monitor or the like) for outputting the display of a shot content is linked through a wireless connection and configured to be separable. A recording unit (memory device or the like) for recording the shot content may also be configured to be separable depending on the configuration of the camcorder.

The content shot (with sound picked up) with the camera unit of the camcorder is not only recorded in the recording unit, but also transmitted wirelessly and displayed on the display unit linked through a wireless connection. The following description will be given on a case where the content shot (with sound picked up) and other information on the camcorder and shooting are principally handled as contents without any particular distinction, but video, sound, and other data may be handled separately. For example, it can be considered such a configuration that the video and other data (information to be notified on the display) are transmitted to the display unit, while the sound and other data (information to be sounded, such as warning sound) are transmitted to a unit exclusively used for sound.

Here, as a method of encoding a shot content from the camera unit, data on coarse materials, which can be subjected to sequential encoding, are transmitted from the camera unit to the recording unit or the display unit sequentially to place emphasis on delay reduction, rather than use of an encoding method practiced across high-quality and high-compression frames even in a state of throughput degradation. Specifically, a hierarchical coding method is applied to the method of encoding the shot content in such a manner that the shot content is hierarchically divided into a checking content (core) layer and a saving content (enhancement) layer and encoded. Information on the checking content layer and information on the saving content layer can be separated from each other, and transmitted and received individually. Further, they can be synthesized to obtain the original shot Content. In this specification, description will be given on a case where a content is hierarchically divided into two layers, but it may be hierarchically divided into three or more layers. Depending on the encoding method, although there may be a case where information on a shot content itself is not restored entirely in the process of reducing redundancy introduced by encoding, such a case is also included as the original shot content.

The checking content (core) layer is to encode a set of coding parameters capable of being subjected to fast encoding, such as low resolution, narrowband, monochrome, and mono, and perform transmission on a frame-by-frame basis. The transmission on a frame-by-frame basis can be divided into transmission units shorter in data transmission unit time, such as per scanning line, per scanning line group, per sub-phonetic segment, or per sub-phonetic segment group. In this specification, coded data belonging to the checking content (core) layer is called checking content coded data.

On the other hand, the saving content (enhancement) layer is to encode a set of coding parameters necessary for the final content, such as high resolution, broadband, stereo, and wide gamut of colors. In this case, high-compression encoding including interframe compression may be performed. Note that the set of coding parameters need to be encoded and transmitted within a range that allows for the delay upon recording the saving content (delay determined mainly by the recording speed of the recording unit or the like). In this specification, coded data belonging to the saving content (enhancement) layer is called saving content coded data, decoding processing for decoding both the checking content coded data and the saving content coded data so that the original shot content can be checked is called saving content decoding, and the content (equivalent to the shot content) decoded by saving content decoding is called the saving content.

Figure 2:
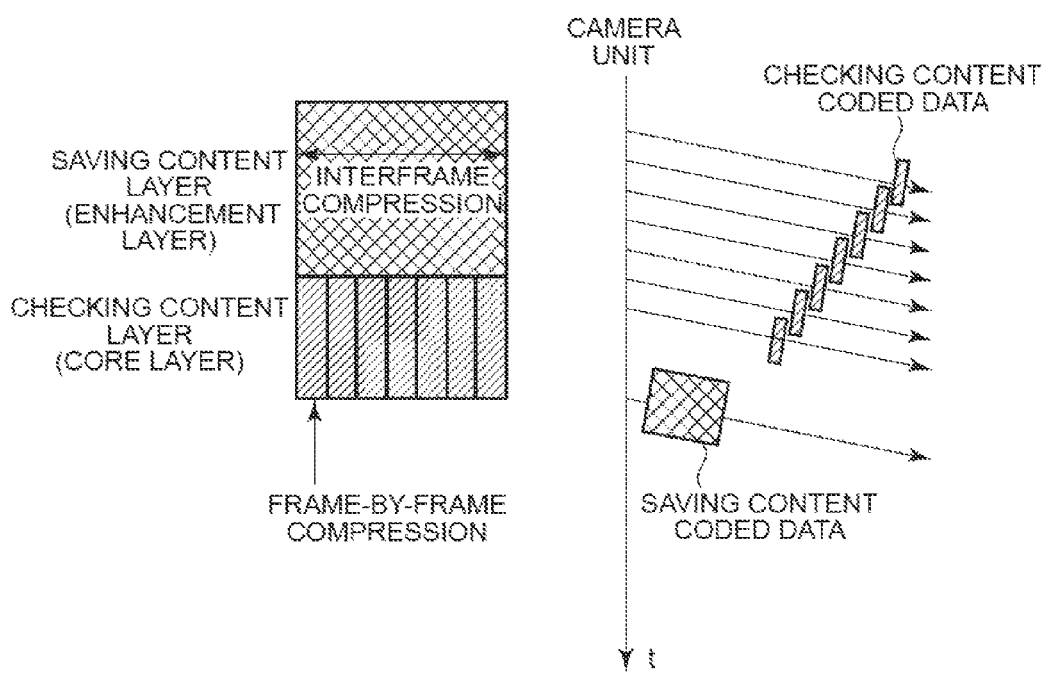
FIG. 2 It is a diagram showing a schematic image of an encoding and transmission method in the embodiment of the present invention.

FIG. 2 is a diagram showing a schematic image of an encoding and transmission method in the embodiment of the present invention. The camera unit applies hierarchical coding to data to be encoded to perform fast encoding on the checking content layer in predetermined units of processing and transmit the created checking content coded data sequentially to the recording unit and the display unit. On the other hand, as for the saving content layer, the saving content coded data is encoded later than the corresponding checking content, and transmitted to the recording unit only (i.e., it is not transmitted to the display unit). Unlike the checking content layer, the saving content layer does not need to perform sequential transmission, and for example, interframe high-compression coding or the like may be performed in consideration of transmission efficiency, the use efficiency of a storage medium for recording, and the like. Thus, the checking content coded data created by fast encoding is transmitted sequentially from the camera unit toward the recording unit and the display unit, and later, the saving content coded data is transmitted only to the recording unit.

The camera unit transmits data of the checking content layer sequentially to both the recording unit and the display unit (steps S802*a* to 802*d*).

The display unit displays sequentially arriving data of the checking content layer to enable the camera operator (or a viewer of the display unit) to check video (step S804). In this case, the display depends on the display system in the display unit, but data other than the shot content (the display of a shooting mode, shooting time, and the like) may be synthesized at the time of transmission of the checking content, or synthesized in the display unit.

When the camera operator (or a viewer of the display unit) enters information on the display unit (using an input device equipped in the display unit) (step S805), the information is transmitted to another appropriate unit (e.g., the camera unit or the like) (step S806).

On the other hand, the camera unit transmits data of the saving content layer only to the recording unit (step S803). In addition to the previously received data of the checking content layer, the recording unit stores the subsequently receiving data of the saving content layer. Upon recording the checking content coded data and the saving content coded data, the recording unit may store them intact without decoding (i.e., in the encoded state), or store the saving content after the checking content coded data and the saving content coded data are decoded, or perform still another encoding.

When a public line, such as a 3GPP line, or a wireless LAN access network is used as the transmission channel between the camera unit and the other units (the recording unit and the display unit), it is desired to set a different QoS (Quality of Service) for each of the transmission of the checking content, the transmission of the saving content, and the transmission of the information entered by the camera operator, respectively. Specifically, it is desired that the checking content coded data should be transmitted as data for which no delay is allowed, and that the saving content coded data should be transmitted correctly in large volumes while allowing for some delay time. Further, the setting of QoS and the transmission method may vary depending on the type of each unit from which coded data is sent. For example, it is desired that coded data to be transmitted to the display unit should be transmitted as data for which no delay is allowed, and that coded data to be transmitted to the recording unit should be transmitted correctly in large volumes while allowing for some delay time. In addition, the information entered by the camera operator and other data may be transmitted by adjusting priority according to the characteristics of each data (such as low delay to operation commands and delay acceptable to the normal battery level indication). It is also desired that data transmission should be managed separately, such as bearer, PDN (Packet Data Network) connection, session, and the like.

As described above, according to the operation in the embodiment of the present invention, the display unit can receive and display the checking content from the camera unit with low delay, and hence the amount of data to be transmitted can be largely reduced compared with the conventional techniques in which a shot content is transmitted intact. Further, since the checking content is encoded more simply in a shorter period than the encoding of the saving content (generally requiring more time to perform encoding), the time required to perform encoding becomes short to enable the camera unit to transmit the checking content immediately.

Next, a configuration example of the camera unit and the display unit in the embodiment of the present invention will be described.

Figure 3:
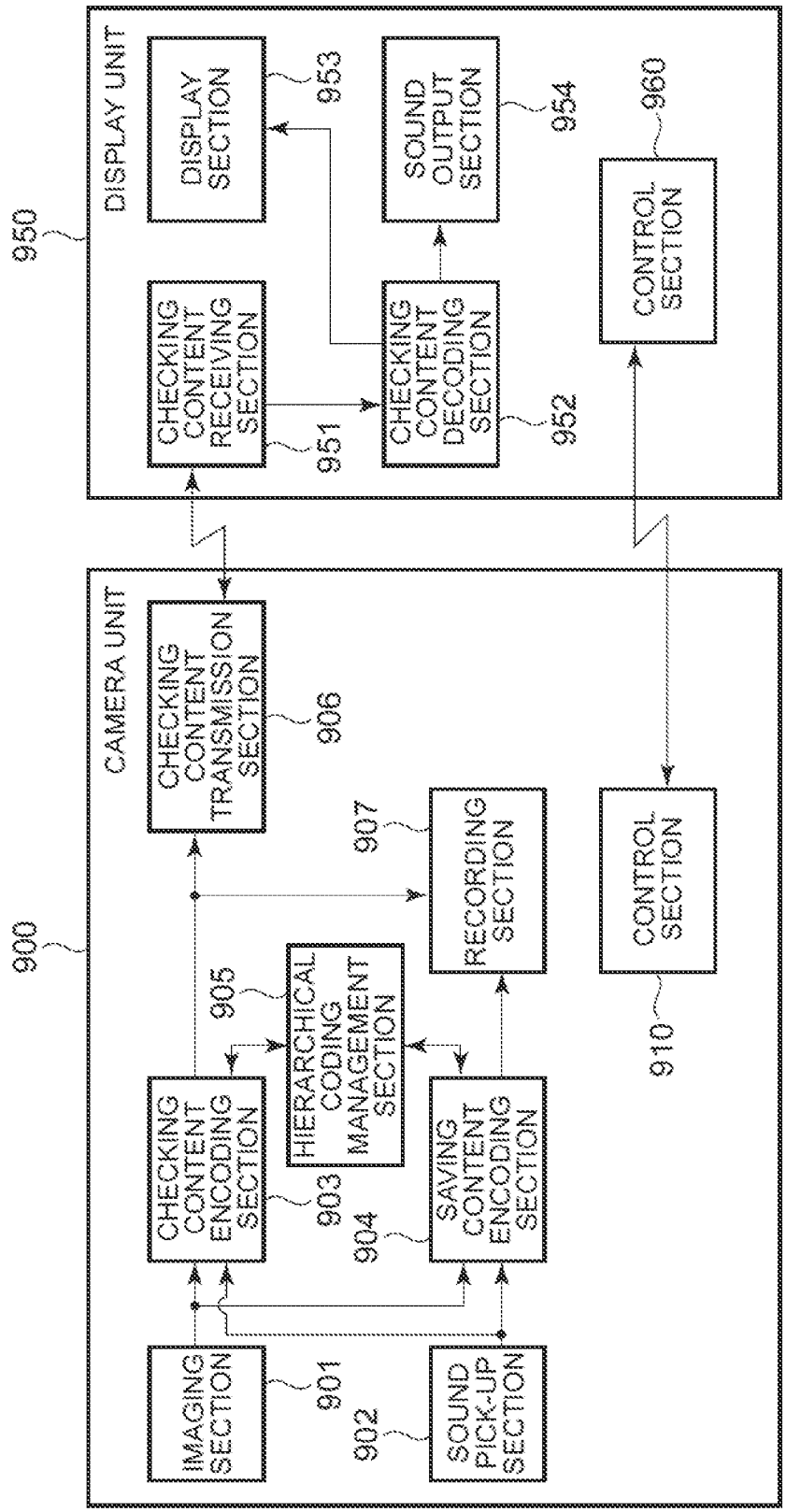
FIG. 3 It is a block diagram showing an example of the configuration of a camera unit and a display unit in the embodiment of the present invention.

FIG. 3 is a block diagram showing an example of the configuration of the camera unit and the display unit in the embodiment of the present invention. A camera unit 900 shown in FIG. 3 has an imaging section 901, a sound pick-up section 902, a checking content encoding section 903, a saving content encoding section 904, a hierarchical coding management section 905, a checking content transmission section 906, and a control section 910.

The imaging section 901 has the function of capturing, as video, an outside subject, and the sound pick-up section 902 has the function of collecting outside sound. Note that the functions of the imaging section 901 and the sound pick-up section 902 are the same as capturing video and sound pickup in normal cameras. In this specification, the video/sound captured in the imaging section 901 and the sound pick-up section 902 are called a shot content. The captured pieces of information (such as video, sound, and other data strings) may be handled individually or collectively as consolidated multimedia data.

The video/audio data captured in the imaging section 901 and the sound pick-up section 902 are supplied to the checking content encoding section 903 and the saving content encoding section 904, respectively.

The checking content encoding section 903 has the function of encoding the shot content to place emphasis on reduction in delay time. The checking content encoding section 903 encodes the shot content in set short-term units of processing (frame by frame, per scanning line, in a unit of several milliseconds, or the like). It is desired that data in each unit of processing should be encoded by a method (e.g., intraframe compression or differential coding from existing processed data) independent of at least the subsequent information so that each unit of processing can be performed without the need to wait for data in the subsequent unit of processing upon decoding.

It is also desired that among the coding parameters, parameters related to the delay time, such as the size of checking content coded data and the processing times required for encoding and decoding, should be set small. For example, if the display on the display unit is checked only to check on the composition or the timing, the resolution of the video may be reduced by encoding the shot content to place emphasis on reduction in delay time, compared with that of the original shot content. In addition, the color gamut may be monochrome and the sound may be monaural. Further, such an encoding method (e.g., the resolution of the display unit or the like) may be made selectable depending on the operations of the camera unit or the other units.

Setting the minimum unit of processing data enables reduction in processing time. In general, hierarchical coding structurally increases overhead as a unit of layers increases, while the number of processing units relatively increases as the unit of clipped processing becomes shorter, and this may have impacts, such as an increase in overhead and reduction in the efficiency of encoding. Therefore, it is desired that the short-term unit of processing should be set from a comprehensive standpoint to reduce the total processing time.

The checking content coded data generated by encoding performed by the checking content encoding section 903 is output to the checking content transmission section 906 and the recording section 907, and the checking content transmission section 906 transmits this checking content coded data to another unit (here, the display unit) via a wireless connection. It is desired that the checking content coded data encoded by the checking content encoding section 903 should be passed from the checking content encoding section 903 to the checking content transmission section 906 on a case-by-case basis so that transmission processing will be performed instantaneously.

Since the checking content coded data is transmitted to another unit (here, the display unit 950), if there is any excess or deficiency in the checking content coded data in regard to one unit of transmission (e.g., a unit of transmitted data size allocated to a transmission period of the communication terminal, a unit of packet size of a transmitted packet, or the like) including overhead related to the other transmissions, it will be considered that the unit does not match the short-term unit of processing, and hence all units are transmitted substantially at the same time regardless of being divided into processing units (where overhead may be increased because of having been divided into processing units), or the unit is further divided into smaller transmission units (where lower latency may be expected). Therefore, it is desired to determine a processing unit in consideration of the transmission unit in the general settings. For example, it is desired that the short-term unit of processing should match the transmission unit or one should be a multiple of the other.

Further, the checking content encoding section 903 may be configured to receive control (dynamic settings of parameters, addition of management information, or the like) from the hierarchical coding management section 905 to enable encoding of a relationship with a corresponding layer (saving content layer), or receive and pass information from and to the saving content encoding section 904.

On the other hand, the saving content encoding section 904 has the function of encoding the shot content with required quality and parameters to generate necessary information on the saving content layer. The saving content coded data generated in the saving content encoding section 904 is output to the recording section 907. In the hierarchical coding, if there are two or more saving content layers, encoding sections may be required for the respective layers. However, description will be made here by taking, as an example, a case where one saving content encoding section 904 exists. In other words, two or more saving content encoding sections 904 may exist for respective layers of hierarchical coding.

Since it can be considered that part of information on the original (captured) video content is encoded in the saving content encoding section 904, the saving content encoding section 904 just has to encode a difference between the original video content and the coded information in the checking content encoding section 903. The saving content encoding section 904 performs, for example, color encoding for monochrome, encoding related to brightness information, encoding related to high-resolution portions for low-resolution video, encoding of a difference of stereo sound from monaural sound, encoding of extended bandwidth sound for narrowband sound, encoding of interpolated data for coarse sampling data, and the like to generate saving content coded data.

Further, the saving content encoding section 904 may be configured to receive control (dynamic settings of parameters, addition of management information, or the like) from the hierarchical coding management section 905 to enable encoding of a relationship with a corresponding layer (checking content), or receive and pass information from and to the checking content encoding section 903.

The hierarchical coding management section 905 has the function of managing each encoding in the checking content encoding section 903 and the saving content encoding section 904 to stratify code in each encoding and configure it as a set of coded data (hierarchical code). Specifically, when a captured shot content is processed in short-term units of processing in the checking content encoding section 903, the hierarchical coding management section 905 has the function of managing correspondence relationships with corresponding one or more short-term units of processing in the checking content encoding section 903 to add (or encode) an additional information element as a hierarchical coding structure. This may also be called a system layer, and the hierarchical coding management section 905 may associate respective coded data encoded in the checking content encoding section 903 and the saving content encoding section 904, control the respective encoding sections (dynamic settings of parameters, addition of management information, or the like) or receive and pass information.

The checking content transmission section 906 has the function of sending the display unit 950 the checking content coded data output from the shot content encoding section 903. Here, since the configuration in which the recording unit is integrated with the camera unit 900 is taken for example, the saving content coded data is not transmitted to the outside. However, when the recording unit is linked by a wireless connection like in the case of the display unit 950, there is a need to provide a saving content transmission section for transmitting saving content coded data like the checking content transmission section 906 for transmitting the checking content coded data.

It is desired that the transmission of the checking content coded data from the checking content coded data transmission section 906 should be processed by giving priority to reduction in delay time. For example, a channel with a short delay time (communication module, interface, or the like) may be selected as the communication channel. If the parameters of the communication channel can be set (including a case where a request can be made of a node managing the communication channel for a QoS parameter or the like), processing for setting the communication channel to reduce the delay time may be performed, or communication processing (for setting a bearer, a session, a connection, or the like) different from data communication including other coded data may be performed.

The recording section 907 has the function of receiving the supply of both the checking content coded data encoded in the checking content encoding section 903 and the saving content coded data encoded in the saving content encoding section 904 and recording these pieces of coded data on the recording medium.

When recording the checking content coded data and the saving content coded data, the recording section 907 may store them intact without decoding (i.e., in the coded state), or a saving content may be stored after decoding the checking content coded data and the saving content coded data, or any other type of encoding may be performed. In the saving content obtained by using the checking content coded data and the saving content coded data, the original shot content can be obtained. Depending on the encoding method, although there may be a case where information on the original shot is not restored entirely in the process of reducing redundancy introduced by encoding, such a case is also included as the original shot content.

The control section 910 has the function of generating and managing other data to perform processing for determining to which unit and in what manner the data are transmitted. The control section 910 can perform control and transmission according to the characteristics of data, such as to generate a shooting time (time code or the like) and transmit it to the display unit 950 for the purpose of display (together with video display) and to the recording unit (not shown in FIG. 3) while controlling it as additional data (not to be included directly in video data), or to transmit the remaining battery level only to the display unit. Further, the control section 910 can also exchange control signals mutually with a control section 960 of another unit (display unit 950).

On the other hand, the display unit 950 shown in FIG. 3 has a checking content receiving section 951, a checking content decoding section 952, a display section 953, a sound output section 954, and the control section 960. The operation of this display unit 950 is simple; it just decodes and outputs received coded data. Specifically, the checking content receiving section 951 receives checking content coded data transmitted from the checking content transmission section 906 of the camera unit 900, the checking content decoding section 952 decodes the checking content coded data, and the display section 953 and the sound output section 954 output a resulting checking content. The control section 960 can exchange data with the control section 910 of the camera unit 900 to receive and control data according to a specific function (the display function in the case of the display unit 950), such as to transmit the remaining battery level only to the display unit.

Note that the configuration of the camera unit 900 and the display unit 950 shown in FIG. 3 is just an example. The camera unit 900 just has to be able to transmit data on a checking content associated with the shot content, which can be sequentially encoded (core layer information in hierarchical coding), by focusing on the delay. The configuration may also be such that a functional block is implemented as part of another functional block, or that a functional block is implemented in another external equipment connectable via an interface.

The destination of the checking content is not limited to the display unit 950, and it can also be transmitted to any other unit. Further, in addition to the checking content coded data, saving content coded data (enhancement layer information in hierarchical coding) can be transmitted to a unit requiring the shot content itself to transmit the shot content to the destination.

Figure 4:
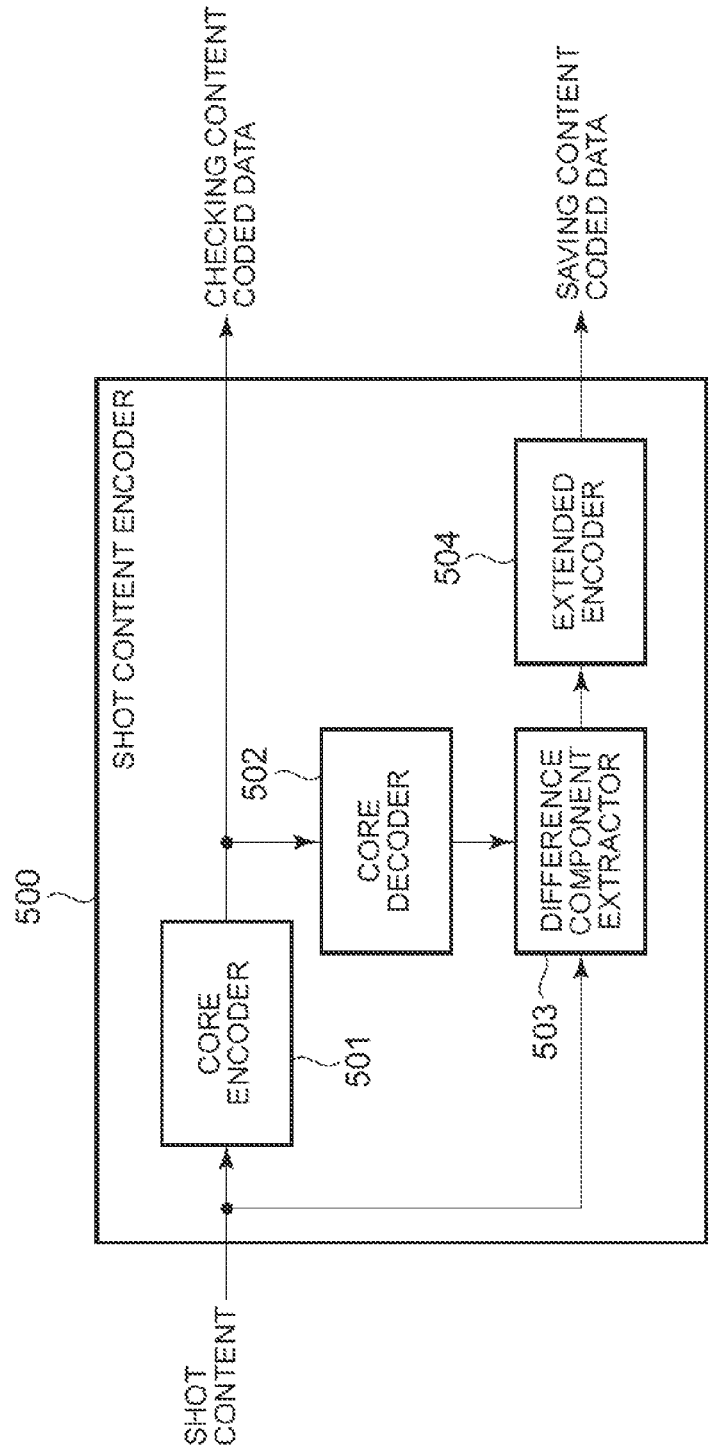
FIG. 4 It is a block diagram showing an example of the configuration of a shot content encoder mountable in the camera unit in the embodiment of the present invention.

FIG. 4 is a block diagram showing an example of the configuration of a shot content encoder 500 mountable in the camera unit in the embodiment of the present invention. The shot content encoder 500 shown in FIG. 4 is illustrated by focusing on a function to create checking content coded data and saving content coded data from a shot content using a hierarchical coding technique.

The shot content encoder 500 shown in FIG. 4 has a core encoder 501, a core decoder 502, a difference component extractor 503, and an extended encoder 504. The core encoder 501 and the extended encoder 504 correspond to the checking content encoder 903 and the saving content encoder 904 shown in FIG. 3, respectively.

A shot content input into the shot content encoder 500 is supplied to the core encoder 501 and the difference component extractor 503. First, the core encoder 501 encodes the shot content to generate checking content coded data including a checking content as a coarse material. The checking content coded data generated in the core encoder 501 is supplied to the core decoder 502. The core decoder 502 performs decoding processing on the supplied checking content coded data to obtain the checking content, and supplies the checking content to the difference component extractor 503.

The difference component extractor 503 extracts a difference component between the supplied shot content and checking content, and supplies the difference component to the extended encoder 504. The extended encoder 504 encodes the supplied difference component to generate saving content coded data. Then, the checking content coded data obtained in the core encoder 501 and the saving content coded data obtained in the extended encoder 504 are output.

In consideration of reduction in delay time with respect to the timings of outputting and transmitting coded data, checking content coded data is first output from the shot content encoder 500 to transmit the checking content coded data instantaneously when the checking content coded data is obtained, and saving content coded data obtained after the remaining processing is performed is next output from the shot content encoder 500. Thus, the checking content coded data to be instantaneously transmitted is sent at least to the display unit, and as a result, the checking content can be played back rapidly on the display unit. Further, both the checking content coded data and the saving content coded data are sent to and recorded in the recording unit. Upon playback of the shot content recorded in the recording unit, a checking content is obtained by decoding performed by a core decoder (the checking content decoder), and a component obtained by decoding performed by an extended decoder (part of the saving content decoder) using the remaining code (saving content coded data) is added to this checking content to enable the playback of the original shot content.

Figure 5:
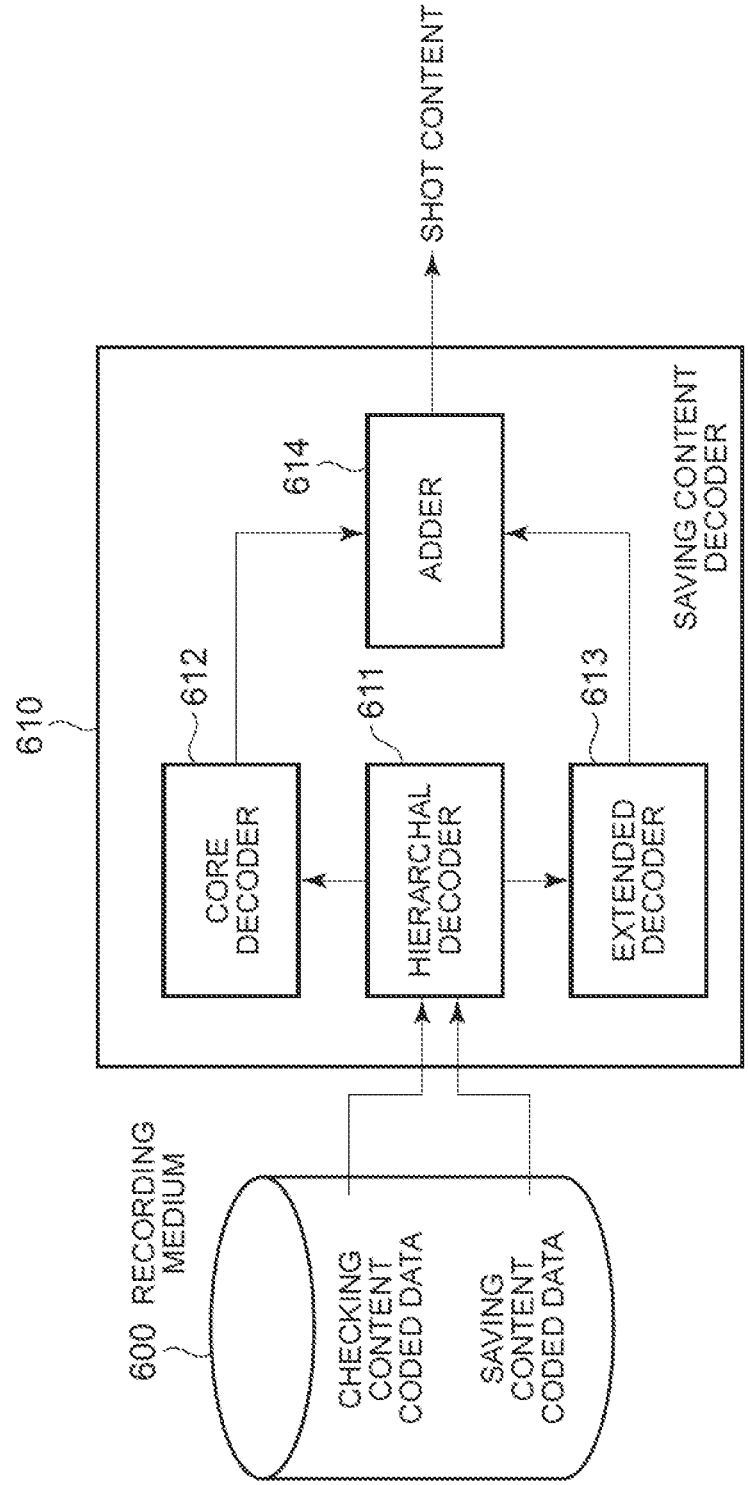
FIG. 5 It is a block diagram showing an example of the configuration of a saving content decoder in the embodiment of the present invention.

FIG. 5 is a block diagram showing an example of the configuration of the saving content decoder in the embodiment of the present invention. Here, it is assumed that the camera unit transmits checking content coded data and saving content coded data to the recording unit, and the recording unit stores the checking content coded data and the saving content coded data on a recording medium 600.

In FIG. 5, upon playback of a shot content recorded on the recording medium 600, the saving content decoder 610 reads corresponding checking content coded data and saving content coded data from the recording medium 600.

The read checking content coded data and saving content coded data are input into a hierarchal decoder 611 for grasping the system layer of hierarchical coding data. Then, under the control of the hierarchal decoder 611 (the management of correspondence relationships between respective hierarchical coding data, or the like), decoding is first performed using all pieces of coded data at a core decoder (decoder equivalent to the checking content decoder) 612 to acquire a checking content, and decoding is next performed at an extended decoder 613 to acquire data corresponding to a difference component from the shot content (i.e., data belonging to the saving content layer). Then, these pieces of data are added at an adder 614 to acquire the shot content.

While the present invention is described in the aforementioned embodiment on the premise of a digital camcorder, the encoding method, the send-back method, the transmission system, and the like according to the present invention can be applied to other existing data communication techniques and various data communication techniques expected to develop in the future. Especially, the present invention is applicable to TV broadcasting or network delivery techniques. Further, in data communication that is becoming possible to allow individuals carrying mobile terminals to distribute/deliver contents shot in various locations regardless of the general public or specific members, the present invention can be widely applied as a personal data delivery method and an intermediate delivery service providing method. Even if the content is single medium data such as sound only (radio broadcasting or the like) or video only (surveillance), it will be apparent that the present invention is applicable.

Further, for ease of explanation, the description is made of the configuration for transmitting all checking contents mainly to the separable display unit, but the equipment configuration may be such that the recording unit is separable, or any other equipment such as a voice unit (a headphone mounted on an operator's head) may also be a separable component, or the configuration may be such that checking contents can be separately transmitted to respective units in a separated state regardless of whether each unit is separable or not. Further, depending on the configuration of separated units, video, sound, and other data may be handled as checking contents and saving contents in different units, or in different encoding sections and decoding sections (in different entities). In this case, video, sound, and other data need to be operated in parallel (in sync with each other) under different controls, respectively, but in the above-mentioned encoding, decoding, and transmission processing according to the present invention can be applied in the same manner in any of the cases.

Further, other data does not necessarily need to be subjected to hierarchical coding. Depending on the nature of data, data may be processed by classifying them into data transmitted to the camera operator together with coded data (checking content coded data) of the core layer and data to be saved only together with coded data (saving content coded data) of the enhancement layer.

Further, in the aforementioned embodiment, while video, sound, and other data are collectively called contents for ease of explanation, and the present invention is described mainly by focusing only on video as a content, specific processing for each of video, sound, and other data can be performed, for example, as follows:

As for video after being imaged, coded data of the core layer and coded data of the enhancement layer are created by hierarchical coding. Then, the coded data of the core layer is transmitted to the display unit and the recording unit, and the coded data of the enhancement layer is transmitted to the recording unit, respectively. Likewise, as for sound after being picked up, coded data of the core layer and coded data of the enhancement layer are created by hierarchical coding. Then, the coded data of the core layer is transmitted to the display unit and the recording unit, and the coded data of the enhancement layer is transmitted to the recording unit, respectively. As for other data, the data are separated into data associated with video and data associated with sound, and both are transmitted to the display unit and the audio output unit as required, respectively. Upon recording, other data are transmitted to the recording unit as required.

When other data (visible data in the data associated with video) is to be transmitted to the display unit, processing may be so performed that, after the data is synthesized with the coded data of the core layer, the synthesized coded data is transmitted to the display unit, or after both are transmitted separately to the display unit, the visible data in the data associated with video and the coded data of the core layer are synthesized in the display unit. Likewise, when other data (acoustic data in the data associated with sound) is to be transmitted to the audio output unit, processing may be so performed that, after the data is synthesized with the coded data of the core layer, the synthesized coded data is transmitted to the audio output unit, or after both are transmitted separately to the audio output unit, the acoustic data in the data associated with sound and the coded data of the core layer are synthesized in the audio output unit.

Further, in the above description, there is illustrated a case where both the camera unit and the display unit are principally located close to the camera operator, but transmission may be performed through a public network or any other wide-area wireless network. Likewise, the recording unit may also exist in a remote location (in the above description, the recording unit is integrated with the camera unit or the display unit, or located close to both units) to perform communication.

In an actual usage environment, it is considered that the device of the present invention may be active before and after the start of shooting. In this case, a shot content in the camera unit is transmitted and a checking content is displayed on the display unit, but it is not actually recorded in the recording unit. Therefore, the recording unit does not need to receive the checking content and the saving content. In this case, only the checking content is transmitted from the camera unit to the display unit. Here, this operating mode is called an idling mode. The above-mentioned mode for shooting accompanied with normal recording and the idling mode may be switched at the timings of the start/end of shooting.

Further, in the aforementioned embodiment, data obtained by adding the checking content and the saving content is matched to the shot content without excess and deficiency by applying hierarchical coding. However, if the camera unit has the function of generating and transmitting the checking content to the display unit and the recording unit can store the shot content, redundant data encoding that does not match the hierarchical coding technique does not need performing. For example, the camera unit may generate saving content coded data including a content overlapping with part of or the entire checking content. In this case, the recording unit just has to perform processing on the assumption that part of or the entire checking content overlapped is included in the saving content coded data. When encoding is performed to include the entire checking content in the saving content coded data, the camera unit 900 shown in FIG. 3 just has to have the checking content encoder 903 and an encoder (shot content encoder) for encoding the entire shot content to be input to transmit the checking content coded data immediately to the display unit and to transmit data obtained by encoding the entire shot content later to the recording unit.

Each functional block used in the explanation of the aforementioned embodiment of the present invention can be realized as an LSI (Large Scale Integration) that is typically an integrated circuit. Each functional block can be individually formed into a single chip, or some or all of the functional blocks can be included and formed into a single chip. Although referred to here as the LSI, the integrated circuit may be referred to as an IC (Integrated Circuit), a system LSI, a super LSI, or an ultra LSI depending on differences in integration.

The method of forming the integrated circuit is not limited to LSI and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured may be used.

Further, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The present invention has the advantage of performing data transmission between units efficiently in a sensing device, in which a sensing unit and the other units (particularly, the display unit or the audio output unit) are separated and connected wirelessly, to improve convenience, and is applicable to a technique for encoding and transmitting content data acquired in the sensing device.

The invention claimed is:

1. A data processing unit connected wirelessly to an output device for outputting sensing data and capable of processing the sensing data to be output by the output device, the data processing unit comprising:
    a data acquiring section configured to acquire the sensing data to be output by the output device;
    a first encoding section configured to encode, with a predetermined quality, the sensing data acquired by and received from the data acquiring section to generate first coded data;
    a radio transmission section configured to transmit the first coded data generated by the first encoding section sequentially to the output device through a radio connection;
    a second encoding section configured to extract, from the sensing data acquired by and received from the data acquiring section, additional information for increasing the quality of a content included in the first coded data, and encode the additional information to generate second coded data; and
    a transmission section configured to separately transmit the first coded data and the second coded data to a recording device to record the first coded data and the second coded data on a recording medium,
    wherein sequential transmission by the radio transmission section of the first coded data is sequential in a temporal manner, and
    wherein the transmission of the first coded data and the second coded data by the transmission section are separated temporally.

2. The data processing unit according to claim 1, wherein the sensing data is video data or audio data.

3. The data processing unit according to claim 1, wherein the first encoding section and the second encoding section are configured to perform hierarchical coding on sensing data acquired by the data acquiring section in such a manner that the first encoding section generates coded data of a core layer in the hierarchical coding as the first coded data and the second encoding section generates coded data of an enhancement layer in the hierarchical coding as the second coded data.

4. The data processing unit according to claim 1, wherein the first encoding section performs sequential transmission in the radio transmission section.

5. The data processing unit according to claim 1, wherein the data processing unit is configured such that the first encoding section performs frame-by-frame compression coding and the second encoding section performs interframe compression coding.

6. The data processing unit according to claim 5, wherein the sensing data includes video data or audio data and other sensing data so that hierarchical coding can be performed on the other sensing data.

7. The data processing unit according to claim 1, wherein the data processing unit is connected wirelessly to the recording device.

8. The data processing unit according to claim 1, wherein the sensing data includes at least video data and audio data, and the first encoding section and the second encoding section are configured to perform encoding processing on the audio data in units of encoding in encoding processing for the video data.

9. The data processing unit according to claim 1, wherein the sensing data includes video data or audio data and other sensing data, and data to be output by the output device is separated from the other sensing data and transmitted to the output device.

10. The data processing unit according to claim 9, wherein the sensing data includes video data or audio data and other sensing data, and data to be recorded by the recording device is separated from the other sensing data and transmitted to the recording device.

11. The data processing unit according to claim 1, wherein the sensing data includes video data or audio data and other sensing data, data to be output by the output device is separated from the other sensing data, and the separated data to be output by the output device is synthesized with the video data or the audio data to be transmitted to the output device.

12. The data processing unit according to claim 1, wherein the sensing data includes video data or audio data and other sensing data, data to be output by the output device is separated from the other sensing data and transmitted to the output device, and in the output device, the separated data to be output by the output device is synthesized with video data or audio data to be output by the output device.

13. The data processing unit according to claim 1, wherein the sensing data encoded by the first encoding section is identical to the sensing data encoded by the second encoding.

14. A data processing unit connected wirelessly to an output device for outputting sensing data and capable of processing the sensing data to be output by the output device, the data processing unit comprising:

a data acquiring section configured to acquire the sensing data to be output by the output device;

a first encoding section configured to encode, with a predetermined quality, the sensing data acquired by and received from the data acquiring section to generate first coded data;

a radio transmission section configured to transmit the first coded data generated by the first encoding section sequentially to the output device through a radio connection;

a second encoding section configured to extract, from the sensing data acquired by and received from the data acquiring section, additional information for increasing the quality of a content included in the first coded data, and encode the additional information to generate second coded data; and a recording section configured to record the first coded data and the second coded data, wherein the first encoding section and the second encoding section are configured to perform hierarchical coding on sensing data acquired by the data acquiring section in such a manner that the first encoding section generates coded data of a core layer in the hierarchical coding as the first coded data and the second encoding section generates coded data of an enhancement layer in the hierarchical coding as the second coded data, and wherein sequential transmission by the radio transmission section of the first coded data is sequential in a temporal manner.

15. The data processing unit according to claim 14, wherein the sensing data encoded by the first encoding section is identical to the sensing data encoded by the second encoding.

* * * * *